Aug. 29, 1950   W. H. GREEN   2,520,540
SCUM BREAKER
Filed Oct. 3, 1946
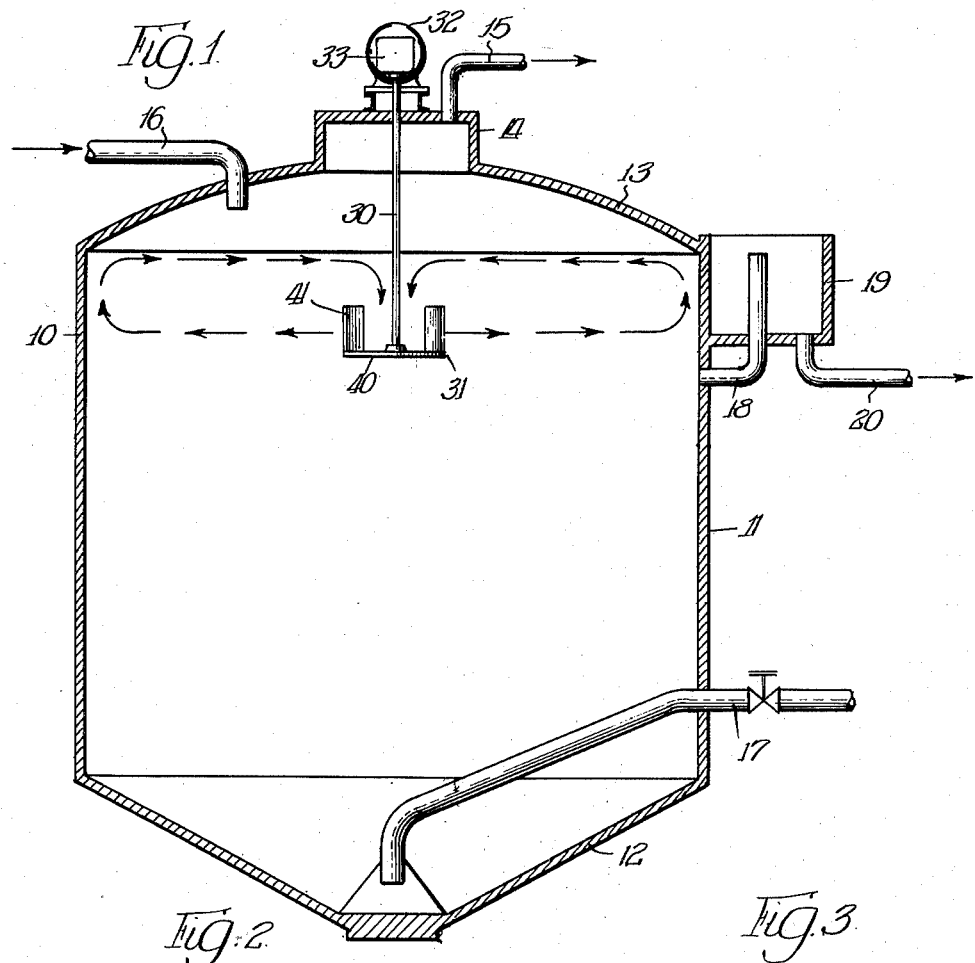
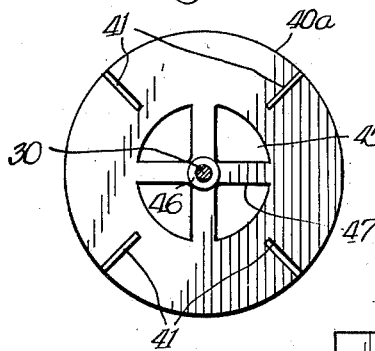
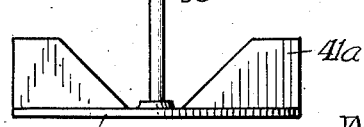
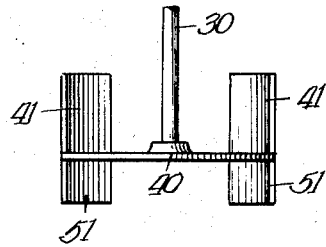
INVENTOR.
Walter H. Green,
BY Patented Aug. 29, 1950

2,520,540

UNITED STATES PATENT OFFICE 2,520,540

SCUM BREAKER

Walter H. Green, Batavia, Ill., assignor to Infilco Incorporated, Chicago, Ill., a corporation of Delaware Application October 3, 1946, Serial No. 700,932

8 Claims. (Cl. 259—8)

This invention relates to scum breaking apparatus.

It is an object of this invention to provide a scum breaker adapted to set up a vortex type flow of large diameter, i. e. normally of diameter equal to that of the container in the strata of liquid underlying the scum.

Another object is a scum breaker which applies centripetal force to the scum and positively draws the scum from the periphery of a tank into the center, thus preventing building up of heavy scum accumulations at the circumference of the tank.

Another object is a scum breaker that moves large quantities of water while rotating relatively slowly, thus requiring a minimum of power.

Another object is to provide a scum breaker of a type that discharges a large volume of liquid outwardly and to a considerable distance in a layer of the liquid a short distance below the surface and at the same time draws liquid inwardly in corresponding volume at the surface in a manner that the liquid tends to flow upwardly around the periphery of the tank and downwardly in the center of the tank, the circulation being mainly confined to a relatively shallow depth of liquid adjacent the surface thereof.

Another object is to provide apparatus of the type mentioned so constructed as to, on rotation thereof, mainly impel the liquid laterally outward.

Other objects of the invention will become apparent from consideration of the description and the claims which follow.

In the treatment of organically polluted liquids, such as sewage and various trade wastes, and the like, sludge is obtained at various stages of the treatment. To dispose of such sludge, or mixtures of sludges, it has become widely accepted practice to resort to anaerobic bacterial decomposition, or digestion, of the sludge. As a result of such decomposition the solids are converted to a stable and innocuous form, with the resultant formation of water and gaseous products, and the remaining solids change their physical form and are compacted in the digestion process. The gases formed in the digestion of sludge rise through the liquid to a space above the liquid surface where they are usually collected and then withdrawn to use or waste. In rising through the sludge liquid the gases entrain solid particles which, due to the gas adhering to them, become buoyant and float on the liquid surface. As more and more of these particles are carried up they form a layer of scum or foam consisting of solids with gas trapped between them which floats on the liquid in the digester. Depending on such factors as the nature of the sludges undergoing digestion and the treatment stage from which they are derived, the degree to which they undergo putrefaction before entering the digester, the pH of the sludge and the like, a great quantity of such scum may be formed and accumulate in the upper portion of the digester, where it interferes with proper operation of the digester.

Various expedients have been used to avoid the formation of such troublesome scum layers or to break them up after they have formed. Thus agitation, or overturning, of the entire contents of the digester has been proposed but has not proven satisfactory, especially in single stage digesters, as it interferes with proper thickening of the sludge. Digester liquid has been withdrawn from the tank and sprayed on top of the scum to break it up. However this is not sufficiently effective, especially with heavy scum accumulations, to justify the considerable cost of pumping and additional piping.

Scum breaker in form of agitators of various kinds which operate in the upper portion of the digester have been found more effective to disperse accumulations of scum and beat them into the liquid. It is to this general type that my invention refers. However the scum breaker of my invention differs materially in construction from the devices heretofore used for this purpose and sets up an entirely new and advantageous flow pattern which is very effective in breaking down even thick and viscous layers of scum in a relatively short time and avoids drawbacks common to prior art scum breakers.

The agitators heretofore used for scum breaking have been of various shapes, such as rotatable arms extending horizontally across the basin, impellers or propellers or the like. To all of these two important characteristics are common: they set up rotation, i. e. agitation in one plane only, or they act on the scum only locally. Rotation alone is, however, not sufficient for an effective breaking up of scum and submerging of the broken up portions in, and mixing with, the liquid in the digester. On the other hand, due to the local centrifugal force applied to the scum in such kind of agitation, heavy scum banks are apt to build up around the circumference of the tank and to interfere with the proper operation of the digester. In other cases the form of such apparatus tends to cause the flow to be mainly upwardly or downwardly.

It has also been proposed to tilt the propellers at an angle from the horizontal in order to add thereby a vertical component to the horizontal rotation. These mixers affect the scum only in a relatively limited area and in order to somewhat enlarge this area they are usually driven at very high speeds, with consequent high power consumption.

To avoid these and other drawbacks I now propose to agitate the liquid through a multiplicity of planes and to do this in such manner that the axis of rotation is parallel to the axis of the tank, whereby scum is not only rapidly broken up but positively drawn into subjacent liquid. I apply centripetal force to the scum, so that it is not thrown outwardly by the agitator, as in prior scum breaking devices, but moved into the center of rotation, thereby avoiding peripheral accumulation of scum. To accomplish this I use a rotor that is able, with relatively slow speed of rotation, to move large quantities of liquid over a large area, and which sets up in the liquid what may be called a closed cycle vortex flow. Such a vortex flow is three dimensional and comprises a spiralling flow with an outward, an upward, an inward and a downward component. The rotor is set up in such manner as to impart to the liquid immediately underlying the scum an inward movement to its axis of rotation and thence downwardly, thus avoiding throwing the scum outwardly, as in the devices heretofore used.

The various aspects of my invention will be better understood by reference to the description and the drawing which forms a part of this specification and wherein Figure 1 is a cross-sectional view of a digester with a scum breaker according to my invention;

Figure 2 shows in plan view a modified form of the rotor of Figure 1;

Figure 3 shows a sectional view of another embodiment of a rotor according to my invention.

Figure 4 shows a rotor similar to that of Figure 1 but with a modified blade construction.

My scum breaker may be used in any suitable digester, such as the lower compartment of an Imhoff type plant, or in separate digesters of any kind, including open tanks and closed tanks with fixed or floating covers. For purposes of illustration only it is shown in Figure 1 as applied to a fixed roof digester of conventional design, which may serve for single stage digestion or as one of the units of a multistage digestion system. Such digester may comprise a tank 10, of any suitable shape, but commonly cylindrical, with a boundary wall 11, a bottom 12 which usually slopes toward the center of the tank, and a gas tight cover 13. In the cover 13 a gas dome 14 may be provided from which a gas line 15 leads to use or waste. Incoming sludge to be digested is usually discharged into the upper portion of the tank, as through an inlet pipe 16. A sludge withdrawal line 17 leads from a lower portion of the tank and supernatant is withdrawn from one or several suitable elevations, as through a supernatant line 18 into a supernatant box 19, and thence through outlet pipe 20 to waste or further treatment. Suitable valves will be provided for the various inlet and outlet lines, as is usual.

The scum breaker may comprise a vertical shaft 30 and a rotor 31 affixed to the shaft 30. The upper end of the shaft 30 is shown as extending through the roof of the tank, and may be rotatably connected to a suitable motor 32 through a reducer 33 in usual manner. The motor 32 and reducer 33 may be supported on the roof 13, as on gas dome 14, as shown, but obviously they could be remote from the digester and connected to the shaft 30 through suitable gearing. One scum breaker is shown in the drawing and normally will be sufficient to produce the necessary flow pattern over the entire cross-sectional area of the tank though the rotor is small as compared with the size of the tank. However, obviously, in very large digesters a plurality of such scum breakers may be used. While single scum breakers will in most cases be axially aligned with the vertical center of the tank, as shown in Figure 1, they may be installed in any suitable part of the tank. Where several scum breakers are used, they will usually be uniformly spaced around the center of the tank.

The rotor 31 comprises a suitable horizontally extending supporting structure 40, such as the solid plate shown in Figure 1, or the annular plate shown in Figure 2, and a plurality of relatively high blades 41 supported by the plate 40, and extending upwardly therefrom. The blades may be spaced uniformly around the periphery of the plate 40 and may be arranged radially, as shown, or set at an angle to the radius of the plate. Only four such blades are shown in Figure 2 of the drawing for purposes of simplification; ordinarily, however, a greater number will be used. The blades may be rectangular, as shown in Figures 1 to 3. In this case, the height of the blades should be greater than their width though both height and width may vary considerably, depending on the specific conditions under which the scum breaker serves. In some cases, as where rags and strings are allowed to enter the digester, it is preferred to slope the inner edges of the blades downwardly toward the center of the plate 40, as shown in Figure 4. With this construction any rags or strings that may catch on the blades will be readily washed away by the centrifugal force of the liquid discharged from the rotor. In any case, with either blade construction, the height of the outer edges of the blades should be at least about one-fifth of the diameter of plate 40, though in many cases higher blades will give better results. It has been established that the relation between the height of the blades and the diameter of the plate 40 has a definite bearing on the operation, and while this relation may vary within certain limits from case to case, a relation of height of blade to diameter of plate of one to five seems to be the minimum permissible. The most important thing for setting up the desired flow pattern is, however, that the blades extend upwardly from their support 40. I prefer that the blades be submerged below the liquid level a distance about equal to the height of the blades, as I have found that this gives best operation.

Rotation of the shaft 30 and rotor 31 by the motor 32 and reducer 33 causes a closed cycle vortex flow embracing the upper strata of liquid in the tank. The upstanding blades 41 of the rotor 34 impart to the liquid a short distance below the surface an outwardly spiraling movement to the wall of the tank and at the same time a corresponding volume of liquid at the surface and immediately underlying the scum is drawn inwardly by the rotor in a spiraling movement toward the axis of the vortex and thence downwardly along the axis. As the liquid is thus rolled away inwardly under the scum, the scum layer breaks down and portion after portion is drawn into the inwardly spiraling movement of, and incorporated in, the liquid in the vortex. As the liquid spirals downwardly and then outwardly the scum is further broken up and gas trapped by the scum is released. The scum particles, thus freed from buoyancy due to the adhering gas, are thereby enabled to settle down into the sludge holding portion of the tank 10. Finally, as the liquid spirals upwardly adjacent the wall 11 of the tank 10 it sweeps along any scum tending to pile up at the periphery and carries it upwardly and then inwardly in its upper spiral flow. Thus any tendency to scum bank formation at the periphery is effectively counteracted and the tank kept free of scum in all its parts.

The rotor 31 need not be rotated at high speeds to produce the desired result. I contemplate peripheral velocities of from about two to about four feet per second. This permits considerable saving in power as against agitators of the type used heretofore for scum breaking. At the same time the action which my rotor exerts on the scum is by far more effective and desirable. This favorable result is obtained due to the fact that my rotor is so constructed that it can move a large quantity of liquid and that this large quantity is moved through a multiplicity of planes, whereas the agitators and impellers heretofore used move only small quantities of liquid through a single plane. These impellers must therefore be rotated at high speed to produce any action on the scum. Even with such high speeds, however, they are effective only over a limited local zone, while my rotor causes the entire scum layer to break down rapidly by rolling the supporting liquid away from under the scum over the entire cross-sectional area of the tank. A vortex, such as set up by the rotor 31, even though the flow therein be relatively slow, creates a powerful suction which draws the scum positively into the vortex flow. When the scum particles are thus incorporated and retained in the spiraling vortex flow, gas that was trapped within them is liberated and the particles lose their buoyancy. Moreover, the particles have an optimum chance to collide with, and adhere to each other in the vortex flow, thus forming heavier particles which will readily settle down into the lower sludge holding portion of the digestion compartment.

Figure 2 shows a modification of the rotor of Figure 1. In this embodiment the plate 40a has a central opening 45. The shaft 30 is journaled in a bearing 46, supported by a spider 47 which may be integral with the annular plate 40a or secured to its inner rim. With this construction of the plate the agitation set up by the rotor involves a deeper layer of liquid. The rotor will pump some liquid from below the plate 40a through the opening 45 and this liquid will be drawn into the vortex flow and mixed therein with liquid from the upper strata. This construction is therefore advantageous where it is desired to extend the mixing and agitation effected by the rotor beyond the shallow stratum of liquid adjacent the rotor.

The embodiment shown in Figure 3 serves the same purpose of extending the agitation and mixing to an intermediate elevation of the digester. In this embodiment a second set of vertical blades, 51, is affixed to the plate 40, which in this embodiment may be solid throughout. The blades 51 extend downwardly from the lower face of plate 40 and may be spaced around its periphery either radially or at an angle to the radius. The size and position of the blades 51 may vary considerably. Thus, the blades 51 can be of the same size as the blades 41, or larger, or they can be smaller, as shown in Figure 3. They can be set nearer to the center or at the same distance from the shaft 30 as the upper blades, as shown. Obviously, if the lower blades 51 are of the same size as the upper blades 41 and set at the same distance from the shaft 30, the vortex set up by them will be substantially equal to that of the upper blades 41 but extend in opposite direction. By making the lower blades smaller, as shown in Figure 3, or by setting them nearer to the shaft 30, the vortex set up by them will be smaller. Thus by varying the size and position of the lower blades 51 any desired portion of the liquid can be included in a vortex flow. The two vortices set up by the two sets of blades 41 and 51 will overlap to some extent at their peripheries and some intermingling of liquid from the different strata will occur thereby. If it should be desired to increase the mixing of the liquid from below the rotor with the upper layers of liquid, a plate with a central opening may be used also in this embodiment.

It will be seen from the foregoing description that I provide a very simple and effective means for breaking up scum over a large area and submerging it in liquid. One of the advantages of my scum breaker lies in the fact that the outward and inward components of the vortex flow set up by the rotor are parallel to the liquid surface and the upward and downward components substantially at right angles thereto. Another essential of successful operation is obtained by applying centripetal force to the scum and thereby moving it inwardly instead of piling it up at the periphery. A further advantage is the low power consumption due to slow rotation.

Many modifications of the construction shown and described herein could be made without departing from the spirit and scope of the invention. Accordingly, it will be understood that I do not wish to limit myself to the exact features of the embodiments shown and described.

I claim:

1. In a digester having an outlet establishing the normal liquid level therein, means for breaking up scum formed on the liquid surface in said digester, comprising a shaft vertically and rotatably mounted in said digester, motor means connected to said shaft to rotate the same, a horizontal plate rigidly affixed to said shaft in the upper portion of the digester, the diameter of said plate being a minor portion only of the diameter of the digester, and a plurality of blades extending upwardly from the upper face of said plate and extending inwardly from the periphery of said plate, the upper edges of said blades being above said plate a distance equal to at least one-fifth of the diameter of said plate and being about the same distance below said outlet.

2. In a digester including a tank having a cover, an inlet for sludge to be digested, an outlet for digested sludge leading from a lower portion of said tank, an overflow establishing the normal liquid level in said tank, and a gas outlet leading from a level in said tank above said normal liquid level, scum breaking means comprising a vertical shaft in said tank and extending through said cover to outside said tank, means outside said tank for rotating said shaft, and a rotor affixed to said shaft in the upper portion of said tank subjacent said normal liquid level, said rotor being characterized by a horizontal plate and a plurality of vertical blades extending upwardly from the upper face of said plate, said blades extending from spaced points of the circumference of said plate inwardly, the height of said blades being at least one-fifth the diameter of said plate and the diameter of said plate being small in comparison to the diameter of said digester.

3. The apparatus of claim 2 wherein the upper ends of said blades are below said normal liquid level a distance substantially equal to the height of said blades.

4. The apparatus of claim 2 wherein said plate has a central opening.

5. The apparatus of claim 2 comprising also a plurality of vertical blades extending downwardly from the lower face of said plate.

6. In a digester including a tank, an inlet into said tank, an outlet from the lower portion of the tank, and an overflow, improved means for breaking up scum formation in said tank, said means comprising a vertical rotatable shaft in said tank, the upper end of said shaft extending to outside said tank, a rotor affixed to said shaft at an upper elevation in said tank subjacent said overflow and rotatable with said shaft, the diameter of said rotor being a minor portion of the diameter of said tank, said rotor comprising supporting means extending at right angles to said shaft and a plurality of vertical blades supported by said supporting means and extending upwardly therefrom and inwardly from the outer portion thereof, said rotor being so constructed and so positioned in said tank as to cause, on rotation of said shaft, a major closed cycle vortex flow in the upper strata only of liquid in said tank embracing the entire cross-sectional area of said tank, and means for rotating said shaft.

7. The combination with a digester having an overflow adjacent its top establishing the normal liquid level therein of scum breaking means so constructed and positioned in said digester as to cause, on rotation thereof, a closed cycle vortex flow of liquid embracing a major part of the cross sectional area of said digester and having a radially inward flow adjacent the level of said overflow, said scum breaking means including a shaft vertically mounted in said digester, means for rotating said shaft, and a rotor affixed to said shaft, said rotor being characterized by a plate surrounding said shaft and extending at right angles thereto, the diameter of said plate being a minor portion only of the diameter of said digester, and a plurality of blades extending upwardly from the upper face of said plate and inwardly from spaced points of its periphery, the upper edges of said blades being sloped downwardly toward the center of said plate.

8. In a digester having an overflow near the top thereof and a sludge outlet from a lower portion thereof, scum breaking means comprising a rotatable vertical shaft extending axially in said tank to an elevation below said overflow, a horizontal support rigidly affixed to said shaft, the diameter of said support being only a minor portion of the diameter of the digester, and a plurality of blades mounted on said support and extending vertically upwardly therefrom, said blades being spaced outwardly from said shaft and extending to the periphery of said support, the top edges of said blades being spaced below said overflow a distance about equal to the height of said blades.

WALTER H. GREEN.

REFERENCES CITED

The following references are of record in the file of this patent:

UNITED STATES PATENTS

| Number | Name | Date |
|---|---|---|
| 727,032 | Tubbs | May 5, 1903 |
| 1,084,210 | Howard | Jan. 13, 1914 |
| 1,375,406 | Merril | Apr. 19, 1921 |
| 1,757,263 | Sims | May 6, 1930 |
| 1,989,589 | Fischer et al. | Jan. 29, 1934 |
| 2,122,287 | Kepper | June 28, 1938 |
| 2,289,645 | Geistert | July 14, 1942 |
| 2,424,679 | Cowles | July 29, 1947 |